United States Patent
McDonald et al.

(10) Patent No.: US 10,825,303 B2
(45) Date of Patent: Nov. 3, 2020

(54) SYSTEM AND METHOD FOR USING ARTIFICIAL INTELLIGENCE TO CREATE LIVE, MOBILE, BETTING SYSTEM OFFERING TIME-SENSITIVE, CURATED AND PLAYER-RESTRICTED BETS ON SUB-OUTCOMES OF SPORTS AND ESPORT EVENTS

(71) Applicants: Brett Dwain McDonald, Ladera Ranch, CA (US); Philip Z. Maymin, Greenwich, CT (US)

(72) Inventors: Brett Dwain McDonald, Ladera Ranch, CA (US); Philip Z. Maymin, Greenwich, CT (US)

( * ) Notice: Subject to any disclaimer, the term of this patent is extended or adjusted under 35 U.S.C. 154(b) by 0 days.

(21) Appl. No.: 16/440,382

(22) Filed: Jun. 13, 2019

(65) Prior Publication Data
US 2019/0392684 A1 Dec. 26, 2019

Related U.S. Application Data

(60) Provisional application No. 62/689,760, filed on Jun. 25, 2018.

(51) Int. Cl.
*G07F 17/32* (2006.01)
*G06N 20/00* (2019.01)

(52) U.S. Cl.
CPC ......... *G07F 17/3288* (2013.01); *G06N 20/00* (2019.01); *G07F 17/3211* (2013.01); *G07F 17/3227* (2013.01); *G07F 17/3237* (2013.01)

(58) Field of Classification Search
CPC .............. G07F 17/3211; G07F 17/3237; G07F 17/3288; G07F 17/3227; G06Q 50/34; G06N 3/08; G06N 3/0454; G06N 3/0445; G06N 20/00
USPC .......................................................... 463/25
See application file for complete search history.

(56) References Cited

U.S. PATENT DOCUMENTS

| | | | | |
|---|---|---|---|---|
| 8,342,924 B2 * | 1/2013 | Leen | ................... | G07F 17/3276 463/1 |
| 9,483,908 B2 * | 11/2016 | Shore | ................... | G07F 17/3241 |
| 2002/0198044 A1 * | 12/2002 | Walker | ................... | G07F 17/32 463/25 |
| 2008/0039192 A1 * | 2/2008 | Laut | ........................ | G06Q 30/00 463/25 |
| 2008/0220854 A1 * | 9/2008 | Midgley | ................. | A63F 13/35 463/25 |
| 2015/0287285 A1 * | 10/2015 | Shore | ................... | G07F 17/3241 463/25 |
| 2018/0330576 A1 * | 11/2018 | Foley | ................... | G07F 17/3262 |
| 2019/0362601 A1 * | 11/2019 | Kline | ................... | G07F 17/3223 |

* cited by examiner

*Primary Examiner* — Michael A Cuff
(74) *Attorney, Agent, or Firm* — Steven R. Pedersen

(57) ABSTRACT

The invention is a system, process, and method that allows players to bet on sports or esports events from their mobile device in a way that is easy-to-understand, simple and fast-paced. Through the use of artificial intelligence, it allows the operator to offer bets only to certain registered members of the system rather than the public at-large thereby automating the balancing of their books through a dynamic offering. It also allows the operator to effectively and automatically generate more bets placed and automatically comply with taxation, laws and regulations of any jurisdiction in the world.

20 Claims, 8 Drawing Sheets

SYSTEM AND METHOD FOR USING ARTIFICIAL INTELLIGENCE TO CREATE LIVE, MOBILE, BETTING SYSTEM OFFERING TIME-SENSITIVE, CURATED AND PLAYER-RESTRICTED BETS ON SUB-OUTCOMES OF SPORTS AND ESPORT EVENTS

RELATED APPLICATIONS

This application claims priority to and the benefit of the filing date of U.S. provisional application Ser. No. 62/689,760, the disclosure of which is incorporated herein for all purposes.

BACKGROUND INFORMATION

The present invention is in the field of games. More particularly, the present invention is in the field of using artificial intelligence in betting or wagering games involving sports, or esports.

In traditional wagering games, the public is offered bets with odds that determine the payout of the bet or spreads between the two sides in a comparative bet. These bets are placed either in-person or online by selecting from all possible bets offered. As long as the player satisfies jurisdictional legal requirements he can place a wager with the operator. While this may require registering with an online platform, such registration does not restrict any member of the public from placing a bet with the operator. Actually placing a bet requires a number of steps including finding the event, finding the particular bet, understanding the odds or spread, inputting or communicating the bet, and placing the bet. The operator has a responsibility to remain legally compliant despite legal differences in different jurisdictions, thus, traditional operators require the player to state that they are located in a jurisdiction that allows wagering. Some operators utilize Internet Protocol (IP) location services to attempt to verify the location of the player. Furthermore, in traditional wagering games, the game operator generally acts as a market maker. They do so by offering bets and odds within a day or two of a particular event and then balancing the amounts of bets and expected payout by setting and adjusting the odds that determine the payout of a bet or wager on a particular betting proposition or by adjusting the spread between the two sides of a comparative bet. For example, a game operator could increase the odds to yield a higher payout in order to attract more bets on an under subscribed event in the betting pool. A game operator could also add or adjust a point spread to a comparative bet, i.e., adding a required performance condition to raise the winning threshold for one side in order to attract more bets to the other side.

In recent years mobile devices have become ubiquitous and the preferred method of interacting with the internet and internet-enabled services. Furthermore, precise Global Positioning Systems (GPS) are pre-installed in almost all devices along with easily accessible application programming interfaces (API's) that allow third-party services to interact with the GPS. Furthermore, sports and esports data has become increasingly available to software systems. The advent of real-time feeds for major sports such as American football, soccer, baseball, basketball, hockey and golf allows the invention of real-time bets on sub-outcomes of events. Recent advances in machine learning methodologies known as deep learning have allowed tremendous capacity for accurate modeling of large quantities of data. Such methodology includes for example recurrent neural networks. Concurrently, technical advances in parallel processing capacity particularly through Graphics Processing Unit (GPU) chips have made training deep learning models a relatively speedy process.

The invention is a system, process, and method that allows players to bet on sports or esports events from their mobile device in a way that is easy-to-understand, simple and fast-paced. It allows the operator to offer bets only to certain registered members of the system rather than the public at-large thereby automating the balancing of their books. It also allows the operator to effectively and automatically generate more bets placed and automatically comply with laws and regulations of any jurisdiction in the world.

TECHNICAL FIELD

The instant invention relates to methods and systems for the use of artificial intelligence in wagering on sporting events and esports.

SUMMARY

In some embodiments, the present invention is computer system configured to solve a problem of offering a community of players a series of progressive and specifically curated bets on an imminent sub-outcome of a sport or esport event in realtime through the use of artificial intelligence to reduce the amount of computer resources that the computer system would otherwise need to perform the scale of the offerings of the progressive and specifically curated bets, comprising at least one specialized computer machine, comprising: a non-transient memory having at least one region for storing particular computer executable program code; a database containing applicable gambling laws, regulations and taxation of worldwide jurisdictions; and at least one processor for executing the particular program code stored in the memory.

In some embodiments, the particular program code is configured to at least perform the following: electronically and in real-time receiving from at least more than one group of electronic devices, information regarding the location of each electronic device in the at least more than one group of electronic devices; wherein the at least more than one group of electronic devices comprises multiple cohorts of electronic devices; and wherein each electronic device in the at least more than one group of electronic devices is associated with a player.

In some embodiments, the particular program code is configured to at least perform the following: electronically and in real-time integrating the information regarding the location of each electronic device in the at least more more than group of electronic devices with the database containing applicable laws, regulations and taxation of worldwide jurisdictions wherein the integration of the transmission of each of the electronic devices location with the database containing applicable laws, regulations and taxation of worldwide jurisdictions comprises a determination of the current jurisdiction of each of the electronic devices.

In some embodiments, the particular program code is configured to at least perform the following: electronically and in real-time causing to display on a first subset of screens of a first cohort of electronic devices a first offer to bet on an imminent sub-outcome of a sport or esport event;

wherein the first cohort of electronic devices is a subset of electronic device from the at least more than one group of electronic devices.

In some embodiments, the particular program code is configured to at least perform the following: electronically and in real-time causing to display on a second subset of screens of the first cohort of electronic devices a second offer to bet on the other side of the first offer to bet the imminent sub-outcome of a sport or esport event.

In some embodiments, the particular program code is configured to at least perform the following: electronically and in real-time receiving from individual electronic devices in the first cohort of electronic devices, bets in response to the first offer to bet on an imminent sub-outcome of a sport or esport event, and the second offer to bet on an imminent sub-outcome of a sport or esport event.

electronically and in real-time causing to display on a first subset of screens of a second cohort of electronic devices the first offer to bet on an imminent sub-outcome of a sport or esport event; wherein the second cohort of electronic devices is a subset of electronic device from the at least more more than group of electronic devices.

In some embodiments, the particular program code is configured to at least perform the following: electronically and in real-time causing to display on a second subset of screens of the second cohort of electronic devices a second offer to bet on the other side of the first offer to bet the imminent sub-outcome of a sport or esport event.

In some embodiments, the particular program code is configured to at least perform the following: electronically and in real-time receiving from individual electronic devices in the second cohort of electronic devices, bets in response to the first offer to bet on an imminent sub-outcome of a sport or esport event, and the second offer to bet on an imminent sub-outcome of a sport or esport event; wherein the first offer to bet on an imminent sub-outcome of a sport or esport event and the second offer to bet on an imminent sub-outcome of a sport or esport event that are offered to the second cohort is a progressive offering with percentages determined based on the first cohort's betting activity.

In some embodiments, the particular program code is configured to at least perform the following: electronically and in real-time recording a time and location record for each bet received.

In some embodiments, the particular program code is configured to at least perform the following: electronically and in real-time calculating of all federal, state and local taxes for each bet received; wherein the progressive offering is further calculated based on the use of artificial intelligence and machine learning.

In some embodiments, the use of artificial intelligence in the decision of which offers of bets to curate to which players involves applications of machine learning on previous betting decisions made by the players, as well as previous betting decisions, made by other, similar players.

In some embodiments, the use of artificial intelligence in the decision of which offers of bets to curate to which players is based upon individual deep learning on the text of previous bet offers.

In some embodiments, the use of artificial intelligence in the decision of which bets to curate to which players is based upon individual deep learning on the parameters of the previous bet offers; wherein the use of artificial intelligence in the decision of which bets to curate to which players is based upon a recommender system that uses artificial intelligence to simultaneously predict the betting decisions of all individual players based on the past history of such decisions for all individual players.

In some embodiments, the composition of the first cohort and second cohort is determined by the location of electronic devices, and the betting history of each of the electronic devices.

In some embodiments, the composition of the first subset of screens of a first cohort, second subset of screens of a first cohort, first subset of screens of a second cohort, and second subset of screens of a second cohort is determined by the location of electronic devices, and the betting history of each of the electronic devices.

In some embodiments, the first offer to bet on an imminent sub-outcome of a sport or esport event, and the second offer to bet on an imminent sub-outcome of a sport or esport event are made when volatility of the bet is near zero.

In some embodiments, the first offer to bet on an imminent sub-outcome of a sport or esport event, and the second offer to bet on an imminent sub-outcome of a sport or esport event are made available for a short time period wherein the bet must be accepted or optionally declined at the end of which the bet is automatically declined.

In some embodiments, first offer to bet on an imminent sub-outcome of a sport or esport event, and the second offer to bet on an imminent sub-outcome of a sport or esport event are made available for an amount of time between 3 seconds and 90 minutes.

In some embodiments, the location information is global positioning system information.

In some embodiments, the database containing applicable laws, regulations and taxation of worldwide jurisdictions, contains the laws, regulations and taxation of all North American, South American, European, Asian, Oceanic, African and Middle Eastern jurisdictions.

In some embodiments, the composition of the first cohort and second cohort is determined by whether the jurisdiction of the location of electronic devices allows for real money bets to be offered on the the sport or e-sport event.

In some embodiments, the calculation of all federal, state and local taxes for each bet received comprises a programmatic calculation of all withholding taxes for the player, and a programmatic calculation of all income taxes for the operator.

In some embodiments, the progressive offering to subsequent cohorts is based on the prior cohorts' betting activity to reduce the operator's net exposure to the bet is made programmatically.

In some embodiments, the present invention is a computer-implemented method for offering a community of players a series of progressive and specifically curated bets on an imminent sub-outcome of a sport or esport event in realtime through the use of artificial intelligence to reduce the amount of computer resources that the computer system would otherwise need to perform the scale of the offerings of the progressive and specifically curated bets.

In some embodiments, the method includes electronically and in real-time receiving from at least more than one group of electronic devices, information regarding the location of each electronic device in the at least more than one group of electronic devices; wherein the at least more than one group of electronic devices comprises multiple cohorts of electronic devices; and wherein each electronic device in the at least more than one group of electronic devices is associated with a player.

In some embodiments, the method includes electronically and in real-time integrating the information regarding the location of each electronic device in the at least more more than group of electronic devices with a database containing applicable laws, regulations and taxation of worldwide jurisdictions wherein the integration of the transmission of each of the electronic devices location with the database containing applicable laws, regulations and taxation of worldwide jurisdictions comprises a determination of the current jurisdiction of each of the electronic devices.

In some embodiments, the method includes electronically and in real-time causing to display on a first subset of screens of a first cohort of electronic devices a first offer to bet on an imminent sub-outcome of a sport or esport event; wherein the first cohort of electronic devices is a subset of electronic device from the at least more than one group of electronic devices.

In some embodiments, the method includes electronically and in real-time causing to display on a second subset of screens of the first cohort of electronic devices a second offer to bet on the other side of the first offer to bet the imminent sub-outcome of a sport or esport event.

In some embodiments, the method includes electronically and in real-time receiving from individual electronic devices in the first cohort of electronic devices, bets in response to the first offer to bet on an imminent sub-outcome of a sport or esport event, and the second offer to bet on an imminent sub-outcome of a sport or esport even.

In some embodiments, the method includes electronically and in real-time causing to display on a first subset of screens of a second cohort of electronic devices the first offer to bet on an imminent sub-outcome of a sport or esport event; wherein the second cohort of electronic devices is a subset of electronic device from the at least more more than group of electronic devices.

In some embodiments, the method includes electronically and in real-time causing to display on a second subset of screens of the second cohort of electronic devices a second offer to bet on the other side of the first offer to bet the imminent sub-outcome of a sport or esport event.

In some embodiments, the method includes electronically and in real-time receiving from individual electronic devices in the second cohort of electronic devices, bets in response to the first offer to bet on an imminent sub-outcome of a sport or esport event, and the second offer to bet on an imminent sub-outcome of a sport or esport event; wherein the first offer to bet on an imminent sub-outcome of a sport or esport event and the second offer to bet on an imminent sub-outcome of a sport or esport event that are offered to the second cohort is a progressive offering with percentages determined based on the first cohort's betting activity.

In some embodiments, the method includes electronically and in real-time recording a time and location record for each bet received.

In some embodiments, the method includes electronically and in real-time calculating of all federal, state and local taxes for each bet received, wherein the progressive offering is further calculated based on the use of artificial intelligence and machine learning.

In some embodiments, the method includes the use of artificial intelligence in the decision of which offers of bets to curate to which players involves applications of machine learning on previous betting decisions made by the players, as well as previous betting decisions, made by other, similar players.

In some embodiments, the method includes the use of artificial intelligence in the decision of which offers of bets to curate to which players is based upon individual deep learning on the text of previous bet offers.

In some embodiments, the method includes the use of artificial intelligence in the decision of which bets to curate to which players is based upon individual deep learning on the parameters of the previous bet offers.

In some embodiments, the method includes the use of artificial intelligence in the decision of which bets to curate to which players is based upon a recommender system that uses artificial intelligence to simultaneously predict the betting decisions of all individual players based on the past history of such decisions for all individual players.

In some embodiments, the method includes a determination wherein the composition of the first cohort and second cohort is determined by the location of electronic devices, and the betting history of each of the electronic devices.

In some embodiments, the method includes a determination wherein the composition of the first subset of screens of a first cohort, second subset of screens of a first cohort, first subset of screens of a second cohort, and second subset of screens of a second cohort is determined by the location of electronic devices, and the betting history of each of the electronic devices.

In some embodiments, the method includes a determination wherein the first offer to bet on an imminent sub-outcome of a sport or esport event, and the second offer to bet on an imminent sub-outcome of a sport or esport event are made when volatility of the bet is near zero.

In some embodiments, the method includes a determination wherein the first offer to bet on an imminent sub-outcome of a sport or esport event, and the second offer to bet on an imminent sub-outcome of a sport or esport event are made available for a short time period wherein the bet must be accepted or optionally declined at the end of which the bet is automatically declined.

In some embodiments, the method includes a determination wherein the first offer to bet on an imminent sub-outcome of a sport or esport event, and the second offer to bet on an imminent sub-outcome of a sport or esport event are made available for an amount of time between 3 seconds and 90 minutes.

In some embodiments, the method location information that is global positioning system information.

In some embodiments, the method includes a database containing applicable laws, regulations and taxation of worldwide jurisdictions, contains the laws, regulations and taxation of all North American, South American, European, Asian, Oceanic, African and Middle Eastern jurisdictions.

In some embodiments, the method includes a determination wherein the composition of the first cohort and second cohort is determined by whether the jurisdiction of the location of electronic devices allows for real money bets to be offered on the the sport or e-sport event.

In some embodiments, the method includes a determination wherein the calculation of all federal, state and local taxes for each bet received comprises a programmatic calculation of all withholding taxes for the player, and a programmatic calculation of all income taxes for the operator.

In some embodiments, the method includes a determination wherein the progressive offering to subsequent cohorts is based on the prior cohorts' betting activity to reduce the operator's net exposure to the bet is made programmatically.

Systems in accordance with other embodiments of the invention provide the player with an application that can be accessed from a mobile device. This application offers bets on sports or esports events that must be accepted or declined within a short time frame before the bet is automatically declined. Furthermore, to accept a particular bet a player has to simply swipe the mobile device with his finger or press one button on the mobile device. The bets offered to the player are based on sub-outcomes of the sport or esport that will be resolved within a short time-frame of in-game play. The bets are offered to players when the volatility of the win probability during an event is near zero. Because systems in accordance with embodiments of the invention provide a short time frame to place bets and a simple swipe or press to place bets, and because bets are resolved in a short time frame based on sub-outcomes of the sport or esport, these systems are more fun, simple, and fast-paced than traditional wagering games. Furthermore, because bets are offered when the volatility of the win probability is near zero these systems allow players to enjoy meaningful game time and provide fun interaction during less-meaningful game time. Systems in accordance with embodiments of the invention use a dynamic offering of bets. A dynamic offering begins by not offering every bet to the public at large as is done in traditional wagering games. Instead, the system segments just the registered player base of the system (members) into 2 or more cohorts. Next, one side of the bet on a particular sub-outcome is offered to some portion of the members in the first cohort of players and the corresponding side of the bet is offered to the remaining portion of members in the first cohort. Typically, both portions will be 50% for offered bets whose outcomes are roughly equally likely, but the portions could be skewed for behavioral, statistical, or other reasons in order to target a balanced book. The system automatically calculates the volume of bets on either side of the sub-outcome as well as the percentage of members in the first cohort that took the bet. The system then adjusts the percentage of players in the second and succeeding cohorts to ensure a balanced book on the particular sub-outcome bet. As a result of restricting bet offerings to cohorts of registered members, the book cannot be unbalanced by the sudden introduction of a previously unknown player that takes the bet. Systems in accordance with embodiments of the invention curate bets offered to particular players based on the preferences and betting behavior of the player. Preferences are inputted directly by the player and can include events, teams, leagues, players, risk variance of bets and/or sub-outcomes that the player prefers to bet on. The system tracks betting behavior of players and curates future offered bets based on this behavior. Systems in accordance with embodiments of the invention utilize push notifications on the player's mobile device to alert the player of offered bets. Finally, systems in accordance with embodiments of the invention use the real-time Global Positioning System of the player's mobile device to automatically determine the current jurisdiction of the player. This allows the game operator to remain fully compliant with state law and only offer bets in jurisdictions where sports and esports wagering is legal. It also allows the game operator to automatically calculate all relevant state and federal taxes for each placed bet and corresponding revenue.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

Figure 1:
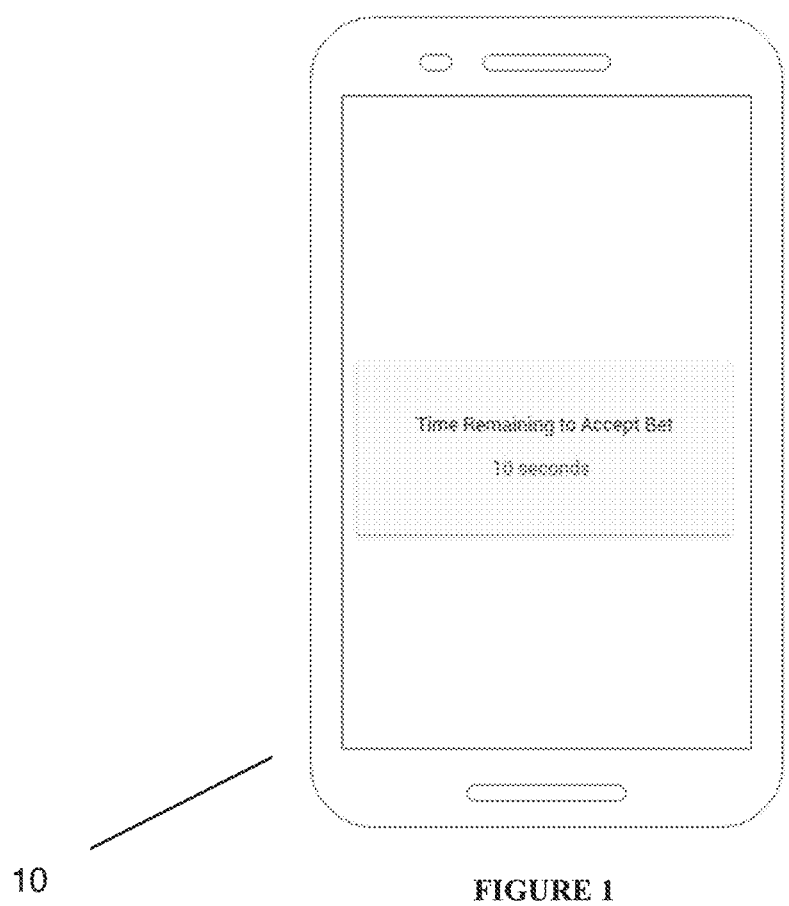
FIG. 1. Illustrates a conceptual diagram of a time-limited betting offer.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

DETAILED DESCRIPTION

The present invention will be further explained with reference to the attached drawings, wherein like structures are referred to by like numerals throughout the several views. The drawings shown are not necessarily to scale, with emphasis instead generally being placed upon illustrating the principles of the present invention. Further, some features may be exaggerated to show details of particular components.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action can occur instantaneously or almost instantaneously in time when another event/action has occurred. In some embodiments, the terms "instantaneous," "instantaneously," "instantly," and "in real time" refer to a condition where a time difference between a first time when a search request is transmitted and a second time when a response to the request is received is no more than 1 second. In some embodiments, the time difference between the request and the response is between less than 1 second and several seconds.

As used herein, the term "dynamic(ly)" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

Illustrative Operating Environments

In accordance with many embodiments of the invention, a gambling application available from a mobile device either as a website or as a native application built on an operating system such as Apple's "iOS" or Google's "Android" presents players with curated bets, one at a time, and players are given only limited time to accept or reject the bet before the bet will automatically be rejected.

Users download the app or access it on the mobile web and are asked to register and sign in. They may register and sign in with a phone number, or a Facebook account, or a Google account, or a Twitter account, or a LinkedIn account, or in general any other authentication system, or they can create an account on the platform directly.

With reference now to FIG. 1. there is illustrated therein a conceptual diagram of a time-limited betting offer. As shown in the figure, the time-limited betting offer is displayed on the screen of an electronic device 10 and notes the amount of time that is remaining to accept the wager.

Figure 2:
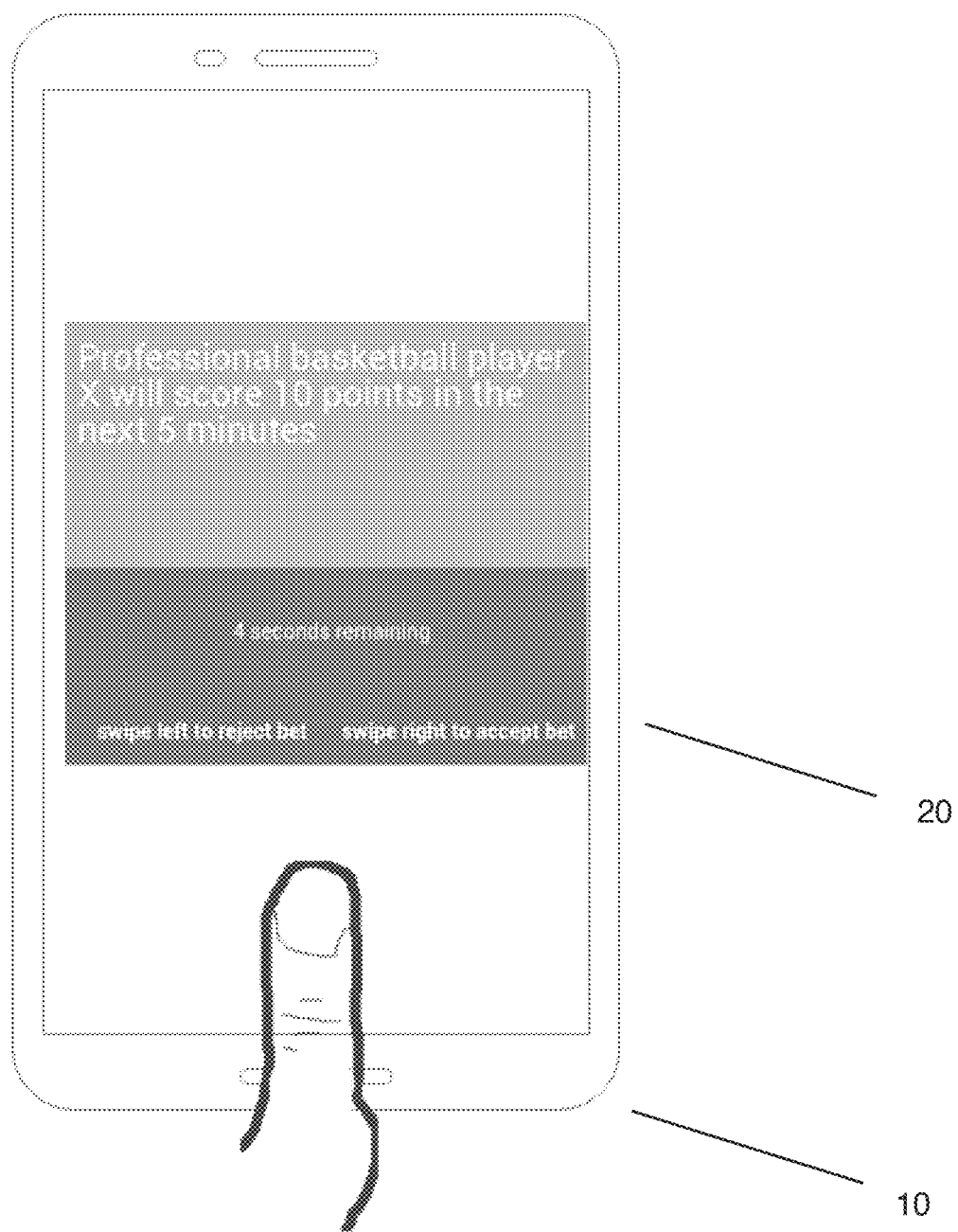
FIG. 2. Illustrates a conceptual diagram of a player accepting or rejecting a bet with a single swipe or button press.

With reference now to FIG. 2. there is illustrated therein a a conceptual diagram of a player accepting or rejecting a bet with a single swipe or button press. As shown in the figure, the bet that is offered is "Professional basketball player X will score 10 points in the next 5 minutes." The person to which the bet is offered is given the option of swiping left to reject the bet and swiping right to accept the bet 20.

In order to be allowed to bet real money, the users allow the app to access the geolocation of the mobile device, and in some embodiments provide proof of identity through a third-party service tied in with the app. Such of proof of identity services are commonplace and typically take the form of, for example, the user uploading both a selfie and a photo of their government-issued license that is then manually compared for compliance.

Figure 3:
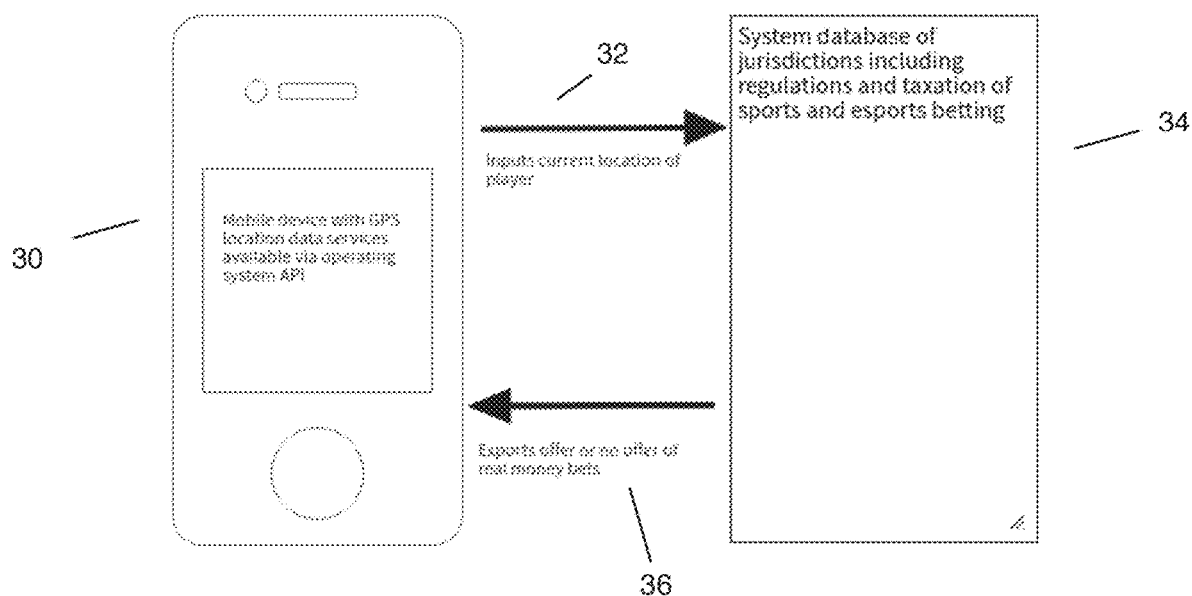
FIG. 3. Illustrates a conceptual diagram of the interaction of the Global Positioning System (GPS) on a player's mobile device with the system's database to restrict or allow bet offers and push notifications to player.

With reference now to FIG. 3 there is illustrated therein a conceptual diagram of the interaction of the Global Positioning System (GPS) on a player's mobile device with the system's database to restrict or allow bet offers and push notifications to a player. In one embodiment the mobile device with GPS location data services is made available via an operating system API 30. The system receives location data 32 of the players, which is integrated into a system database 34, that includes a database of jurisdictions, which may include regulations and taxation of sports and esports betting. As shown in the diagram, the system then makes a determination 36 as to whether to export an offer or no offer of a real money bet to the player.

In accordance with many embodiments of the invention, bets are curated for each particular member by asking for a member's preferences. Members can input their preferences of particular sports, leagues, teams, events, players, currency, risk variance of bets and/or sub-outcomes that the player prefers to bet on.

Figure 4:
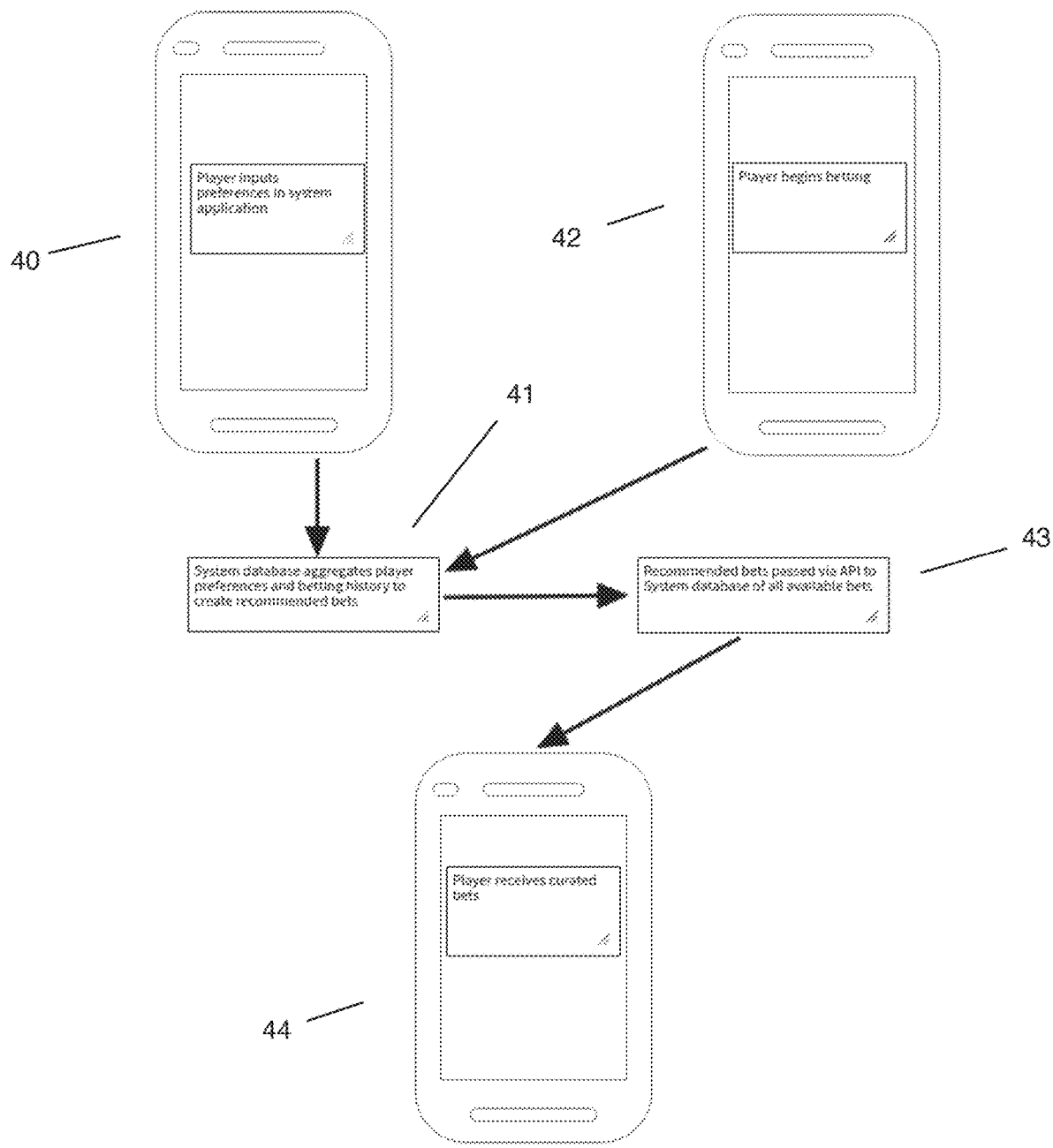
FIG. 4. Illustrates a conceptual diagram of the interaction of a player's preference input, the systems player database, the system's database of all available bets and the player's betting history in order to provide a curated betting experience to the player.

With reference now to FIG. 4. there is illustrated therein a a conceptual diagram of the interaction of a player's preference input, the systems player database, the system's database of all available bets and the player's betting history in order to provide a curated betting experience to the player. In the embodiment shown, a player may input preferences into a system application 40, which are then stored into a system database 42. Similarly, as shown in 41, once the player begins betting 41, the betting history along with the player preferences are aggregated 82 to create recommended bets.

The recommended bets are then passed via an API to the system database 43 of the all the available bets, which allows for the player to receive a curated bet 44.

The following is a non-limiting example of types of sports a member could select as preferred betting opportunities:
1) Basketball
2) Football
3) Baseball
4) Soccer
5) Hockey
6) Golf
7) League of Legends
8) Counter-Strike GO
9) Dota2
10) Fortnite The following is a non-limiting example of types of leagues a member could select as preferred betting opportunities:
1) National Basketball Association games
2) College basketball games
3) National Football League games
4) College football games
5) Major League Soccer games
6) Major League Baseball games 7) College baseball games
8) National Hockey League games
9) Professional Golfers Association Tour tournaments
10) Professional League of Legends games
11) Professional North American Counter-Strike Go games
12) Professional North American Fortnite games
13) Professional European Dota2 games
14) Premier League Soccer games
15) Professional Soccer games The following is a non-limiting example of types of teams a member could select as preferred betting opportunities:
1) Team Liquid League of Legends
2) Carolina Panthers
3) UCLA Bruins Football
4) Los Angeles Lakers
5) NY Islanders
6) Seattle Sounders
7) Real Madrid
8) US Mens National Soccer Team The following is a non-limiting example of types of events a member could select as preferred betting opportunities:
1) The 2018 US Open
2) Colorado Rockies vs Boston Red Sox Jun. 22, 2019
3) Team Dignitas vs Team EchoFox League of Legends game on Aug. 5, 2018

The following is a non-limiting example of types of players a member could select as preferred betting opportunities:
1) LeBron James
2) Lionel Messi
3) Tiger Woods
4) Bryce Harper The following is a non-limiting example of currencies a member could select to denominate their preferred betting opportunities:
1) U.S. Dollar
2) Euro
3) British Pound
4) Japanese Yen
5) Bitcoin
6) Ethereum The following is a non-limiting example of types of risk variance of bets a member could select as preferred betting opportunities:
1) Roughly even odds
2) Favorites, where the likelihood of winning is high but the payoff is low
3) Underdogs, where the likelihood of winning is low but the payoff is high
4) Extreme favorites, where the likelihood of winning is very high but the payoff is very low
5) Extreme underdogs, where the likelihood of winning is very low but the payoff is very high The following is a non-limiting example of types of sub-outcomes a member could select as preferred betting opportunities:
1) Points in hockey games
2) Assists in basketball games
3) Tackles in football games
4) Interceptions in football games
5) Red cards in soccer games
6) First Blood in League of Legends games When a preference is input by the member, the system will introduce bets on the particular sport, league, team, event and/or player preference into the member's bet feed at appropriate live times when the member is part of a particular cohort for an offering.

In accordance with many embodiments of the invention, bets are curated for each particular member by tracking a member's preferences and betting history. Betting history is determined by storing a table of bets in a database where each row contains the following information:
  Member ID: the unique identification number of the member
  Offered Bet ID: the unique identification number of the specific bet offered
  Cohort: the number of the cohort for this offered bet the member belongs to
  Side: offered the regular side, or the opposite side of the specific bet
  Offered Size Multiple: typically 1, but a number indicating how much the bet was customized scaled for the specific member, whether the offer was scaled up relative to the standard offer (if the multiple is greater than one) or down (if the multiple is lower than one)
  Offered Currency: a currency such as US Dollar, Japanese Yen, etc.
  Offered Currency Multiple: the multiple on the standard US Dollar amount that converts the offered amount of winning and losing into the member's preferred currency
  Date and Time Offered
  Total Seconds Spent Viewing: the amount of time the member had the bet displayed and visible on their screen
  Result: one of Accept/Reject/Expire
  Accepted Size Multiple: typically 1, but a number indicating how much the member chose to scale the bet up (if the multiple is greater than one) or down (if the multiple is lower than one).

In separate tables, member information and preferences may be stored alongside their unique Member ID, and Offered Bets are stored in a table where each row contains the following information:
  Offered Bet ID: the unique identification number of the specific bet offered
  Game ID: the unique identification number of the specific game
  Wall Clock: the exact real-world date and time when the offer was calculated
  Type ID: a unique identification number indicating whether the sub-outcome was eg Points Scored, Tackles, First Blood, or other measurable event
  Team: one of Away/Home/Null, where Null indicates the sub-outcome is not a team-based outcome
  Player ID: a unique identification number of the player whose performance is being measured, or Null indicating the sub-outcome is not a player-based outcome
  Period Start: the period/quarter/inning when the sub-outcome begins accumulating
  Time Start: the time within the period when the sub-outcome begins, measured in seconds from the beginning of the period
  Period End: the period/quarter/inning when the sub-outcome finishes accumulating
  Time End: the time within the period when the sub-outcome ends, measured in seconds from the beginning of the period
  Opponent Player ID: a unique identification number of the opposing player whose own performance on the sub-outcome will be subtracted from the performance of the given player, or Null indicating the player's performance will be measured on an absolute scale, or 0 indicating the player's performance will be measured relative to the best of the remaining players.

Minimum: the minimum number of net occurrences of the sub-outcome during the relevant periods that indicate a winning bet, could be zero or any positive number Maximum: the maximum number of net occurrences of the sub-outcome during the relevant periods that indicate a winning bet, could be zero or positive infinity or any positive number Net occurrences refer to the difference in performance between the Player and the Opponent Player, or, if the Outcome Player is Null, then the raw performance of the Player.

If both Team and Player ID are Null, then the total across all players on all teams of the sub-outcome metric is computed. For example, a row that contains these inputs:

Points Scored, Away, Null, 2, 0, 2, Infinity, LeBron James, −Infinity, 0 refers to a bet that the away team will score less than LeBron James in the second quarter.

The Type IDs are stored in a table where each row contains the following information:

Type ID, League ID, MetricVerb, MetricNoun, MetricComp

The system implements the following extensible grammar of possible bets:

Performer
will
MetricVerb
Amount: (Minimum or more [if Maximum is Infinity and Minimum>0]
|more [if Maximum is Infinity and Minimum=0]
|Maximum or fewer [if Maximum>0 but not Infinity and Minimum<=0]
|fewer [if Minimum is Negative Infinity and Maximum=0]
|zero [if Minimum=Maximum=0]
|a [if Minimum=Maximum=1 and MetricNoun starts with a consonant]
|an [if Minimum=Maximum=1 and MetricNoun starts with a vowel]
|between Minimum and Maximum [unless Minimum=Maximum=1])
MetricNoun singular if Minimum=Maximum=1, otherwise pluralized
(MetricComp/Amount than Opponent [if Opponent is not Null or 0]
|MetricComp/Amount than any other player [if Opponent is 0])
from Start Period and Time to End Period and Time
where:
Performer is a team name, player name, or the phrase "Both teams combined"
MetricVerb is a verb such as score, rebound, get, have, place, etc.
MetricNoun is a noun such as points, rebounds, wards, etc.
MetricComp is a comparison operator that is either "more" or "earlier" depending on if the metric in question is a value- or time-based occurrence
Opponent is a player name if the identifying number is neither Null nor zero and MetricComp/Amount means MetricComp if MetricComp is "more" and Amount does not contain the words "more" or "fewer", and is blank if it does, and is MetricComp if it is not "more"
the remaining terms having the same meaning as above.

This grammar is further refined for sport-specific bets. For example, for baseball bets during a particular inning when the time periods are effectively irrelevant, the time portion of the grammar would simply reduce to eg: "in the fourth inning." For bets on esports or other sports where there are no periods, the time portion would simply reduce to eg: "from minutes six through twenty" or "after the 10-minute mark."

In accordance with many embodiments of the invention, the software utilizes push notifications on the player's mobile device to alert the player of offered bets. Push notifications are alerts raised by the mobile device, with the user's prior permission, that notify the user of an incoming bet, in the same way that email alerts or text alerts notify mobile users of an incoming message.

Figure 5:
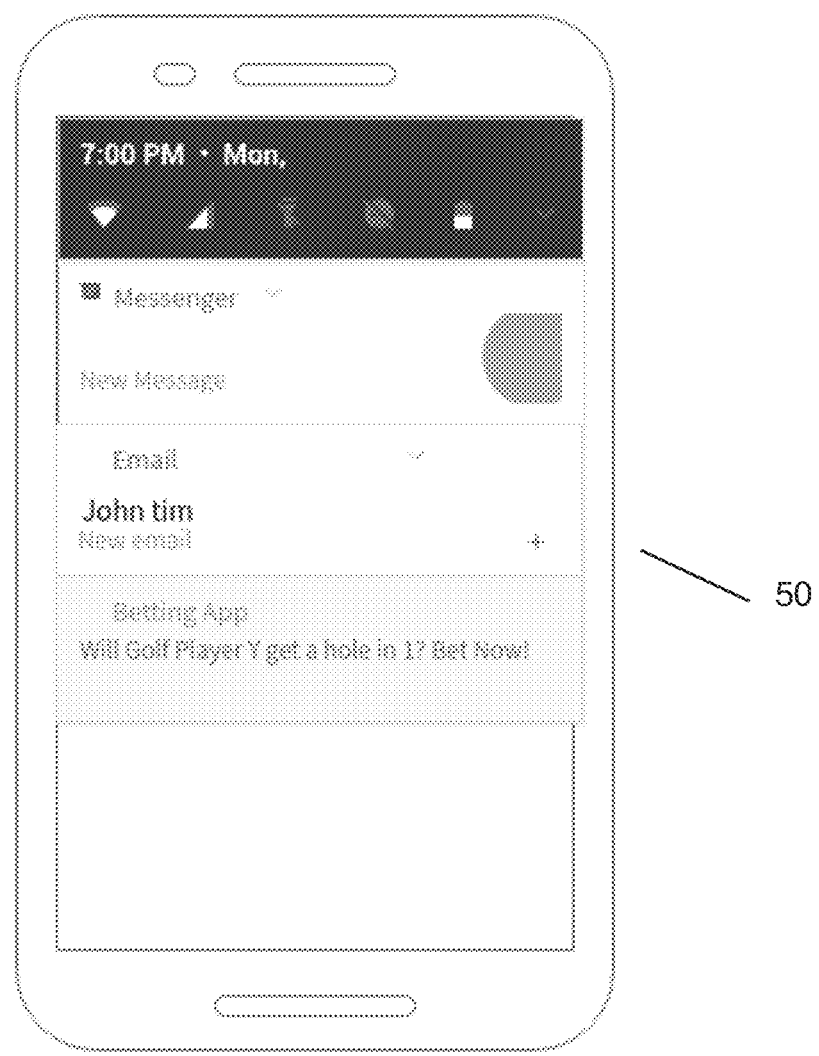
FIG. 5. Illustrates a conceptual diagram of a push notification to a player's mobile device FIG. 6. Illustrates a graph of the volatility of win probability alongside bet offers during a hypothetical basketball game.

With reference now to FIG. 5. there is illustrated therein a conceptual diagram of one embodiment of a push notification 50 to a player's mobile device. In the embodiment shown, the player is offered a bet that says "will player Y get a hole in 1? Bet Now!"

In accordance with many embodiments of the invention the betting application presents a series of cards. Each card presents only 1 betting opportunity and consumes almost the entirety of the screen of the mobile device ensuring that the player is not overwhelmed with information or options.

In accordance with many embodiments of the invention each bet must be accepted or rejected in a short amount of time before the bet is automatically rejected. For example, a bet may have a time limit of 90 minutes, 30 minutes, 15 minutes, 10 minutes, 5 minutes, 3 minutes, 1 minute, 30 seconds, 15 seconds, or 3 seconds.

In accordance with many embodiments of the invention each bet can be accepted by swiping the bet card to the right of the mobile device. Each bet can be rejected by swiping the bet card to the left of the mobile device with a finger. Each bet could potentially be modified by selecting smaller or larger notional amount for the bet from a pre-selected and curated menu of options for multiplying the size of the bet up or down by certain factors.

In accordance with many embodiments of the invention, bets are presented to the player when the volatility of the win probability of the event is near zero to ensure the player is not missing relevant action.

The win probability is a number between zero and one, or, equivalently, between zero percent and 100 percent, indicating how likely a particular team is to win its current game. For sports such as basketball that do not allow draws, the win probability of one team is equal to one minus the win probability of the other team.

Figure 6:
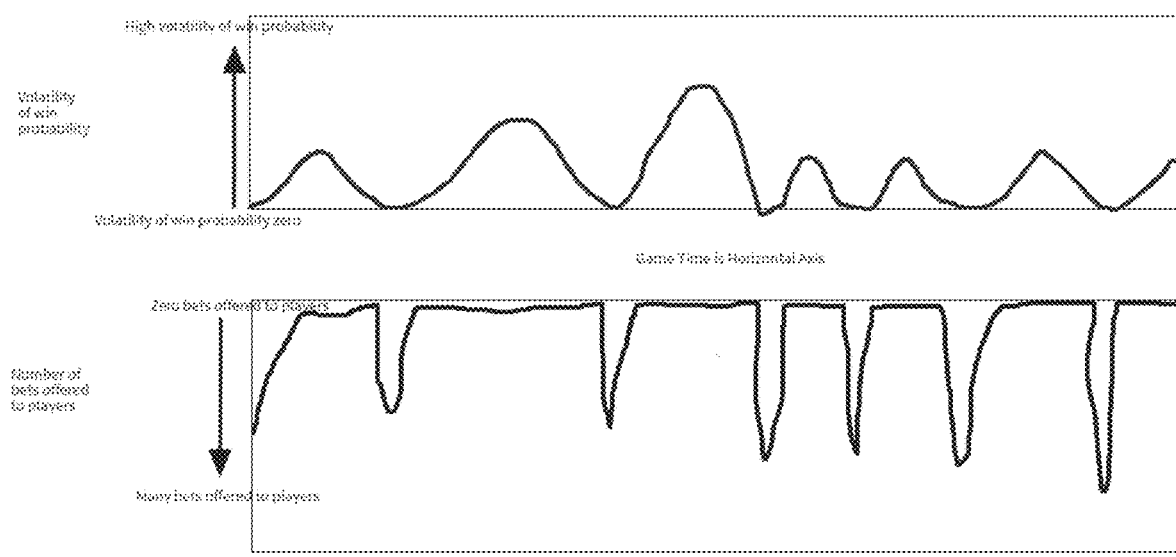

With reference now to FIG. 6. there is illustrated therein a graph of the volatility of win probability alongside bet offers during a hypothetical basketball game. As shown therein, in one embodiment, the number of bets that are offered to players increases as the volatility of the win probability approaches zero. In contrast, as the volatility of the win probability increases, the number of bets offered to players decreases.

The win probability can be calculated by counting the proportion of times that similar teams in similar circumstances ended up winning their respective games over a recent historical period. However, there may be situations that have never occurred exactly that way before in the historical sample but for which nearby or similar situations have occurred. For example, a basketball game with a score of 140-95 with two minutes left may be a first time occurrence, but there may have been games with scores of 141-94 or 139-98 with two minutes left. Therefore, a more general approach is to use either logistic regression or machine learning such as random forests or deep learning on a dataset where the dependent variable is whether the home team ultimately won or not, and the independent variables reflect the current context of the game. The determination of whether the away team won can then either be the result of a separate regression or machine learning run, or more typically simply computed as one minus the home team's win probability.

Logistic regression is a standard statistical technique where the log-odds of an event's probability depend linearly on a set of independent variables. Machine learning is a statistical and computational process of repeated backwards modification to a presumed type of function whose inputs get adjusted so that the outputs more closely match actual values. A standard form of machine learning is a neural network, or a hierarchy of neural networks, or a sequence of more complicated gates such as gated recurrent units.

As such, in some embodiments, the use of artificial intelligence in the determination of what bets are likely to constitute roughly fair propositions applies machine learning techniques such as neural networks or random forests on historical in-game sports data. The data is arranged to indicate the state of the historical game at a particular moment in time, including which athletes are on the field or court, the time remaining, the score so far, and other standard sport-specific state variables. Given a comprehensive high frequency history of games organized in this manner, the artificial intelligence of the machine learned outputs is used to craft new bet offers that, according to the artificial intelligence model, are predicted to have a roughly even chance of success in the intervening time period for the current live game in question with its current live game state parameter values.

In some embodiments, the use of artificial intelligence in the decision of which bets to curate to which players involves applications of machine learning on previous decisions, views, and swipes made by the player, as well as previous decisions, views, and swipes made by other, similar players. There are three approaches to using artificial intelligence to solve this problem.

In some embodiments, the first is individual deep learning on the actual text of the bet offers. In this approach, a person's own history of bet offers are the input, and the decisions to swipe left, swipe right, never view, or allow to expire are the output, and together they comprise the training set to be learned by a recurrent hierarchical neural network. That recurrent neural network is then applied to new curated bets to calculate the probability that the given individual will accept the proposed offer. The automatic balancing algorithm described elsewhere in this application uses these probabilities as inputs to decide on the basis of that artificial intelligence which bets to offer to which players, and at what time.

In some embodiments, the second is individual deep learning on the parameters of the bet offers. As described elsewhere in this application, the list of parameters are the underlying parts of the grammar that are combined to create natural language text. Unlike the first approach, this second approach uses the actual values of the parameters as the inputs, but keeps the same output as before. This second approach provides the artificial intelligence to determine which types of bets, or during what periods, or for what sports, are specifically preferred by the individual, rather than relying on the artificial intelligence automatically learning it from the natural language text.

In some embodiments, the third is collaborative filtering or a recommender system that uses artificial intelligence to simultaneously predict the swiping actions of all individuals based on the past history of such decisions for all individuals. This approach too can be further bifurcated into either using the text as the input or the underlying parameters.

Combinations of the above also involve artificial intelligence in the form of ensemble decision trees and ensemble decisions.

One of the standard contexts of variables to include in all sports are the pre-game wagering-implied win probabilities for each of the two teams. The wagering-implied probabilities of winning for each team are calculated from the closing lines of wagering markets for the games.

A money line bet such as −140 on a team indicates that a bet would lose $140 if the team loses while winning $100 if the team wins. This converts to a win percentage as follows: −140/(−140−100)=58.333%. A moneyline bet such as +120 on a team indicates that a bet would lose $100 if the team loses while winning $120 if the team wins. This converts to a win percentage as follows: +100/(+100+120)=45.45%. By use of these algorithms, moneyline closing lines can be converted into pre-game win probabilities, which are then used as one of the inputs for each of the sports when calculating the live win probabilities.

For basketball, typical context includes the home team's score, the away team's score, the time remaining in the game, the number of team fouls for the home and away team, the number of rebounds, assists, blocks, and steals for the home and away team (as separate factors), and the pre-game wagering-implied probabilities of the two teams.

For baseball, typical context includes the home and away scores, the current inning, the number of outs, the number of strikes and balls for the current pitch, indicator variables noting whether each base is currently occupied or not, and the pre-game wagering-implied probabilities of the two teams.

For football, typical context includes the home and away scores, the current down and distance, the time remaining, the field position, and the pre-game wagering-implied probabilities of the two teams.

For soccer, typical context includes the home and away scores, the time remaining, and the pre-game wagering-implied probabilities of the two teams.

Similar approaches are used in other sports.

Once a win probability model is calculated as per the above, it can be applied to the live context of any game. The values of the relevant parameters are obtained through third-party providers of live sport statistics. These parameters are then fed into the win probability model to determine the probability of each team winning.

In certain situations, it is impossible for the win probability to change. Some examples include: timeouts, intermissions between periods, and other stoppages in play. In such situations, the volatility of the win probability is zero: it will not change. In other situations, it is very unlikely for the win probability to change. Some examples include: so-called "garbage" time at the end of a game whose winner is virtually impossible to change even though the final score could change, transition periods such as a football team setting up for the next play, and other times when the likelihood a team's victory is highly unlikely to change. These are all periods of zero or near zero volatility of win probability. More generally, the win probability model is applied in real-time to the live feed of sports statistics, and the rolling standard deviation of that win probability is computed for a window of several seconds or minutes.

When that standard deviation is near zero, the volatility of the win probability is near zero.

In accordance with many embodiments of the invention, the bets are simple to understand propositions on sub-outcomes of a sports or esports event. The sub-outcomes are computed from live feeds of play-by-play information of the games. Feeds can be either "pull-style" meaning the information is routinely requested from the application programming interface (API) of the third-party provider of the information, for example every second, or "push-style" meaning that the information is automatically fed by the API into the database for computation of sub-outcome results.

The following is a non-limiting example of bets offered during a basketball game:
1. Player A will score X or more points before the 5 minute mark of the 1st Quarter.
2. Player A will grab X or fewer rebounds in the 3rd Quarter.
3. Player A will outscore Player B in the second half.

The following is a non-limiting example of bets offered during a baseball game:
1. The away team will score X or more runs by the third inning.
2. Pitcher X will have two or more strike-outs within the next three innings.
3. The home team will hit a home run first.

The following is a non-limiting example of bets offered during a League of Legends game:
1. Team X will get first blood.
2. Player X will have four kills within the next six minutes.
3. Player Y will place more wards than any other player in the next 5 minutes of game time.
4. Player Y will get more gold than any other player in the game from now until the end of the game.
5. Team X will gank for a kill in the first 10 minutes of the game.

The following is a non-limiting example of bets offered during a football game:
1. Team X will score a touchdown in the next four minutes.
2. Player X will run for more than 40 yards before the end of possession.

In accordance with many embodiments of the invention, the operator's system uses dynamic offering to ensure a balanced book on each bet. A dynamic offering begins by not offering every bet to the public at large as is done in traditional wagering games. Instead, the system segments just the registered player base of the system (members) into 2 or more cohorts. Next, one side of the bet on a particular sub-outcome is offered to some portion of the members in the first cohort of players and the corresponding side of the bet is offered to the remaining portion of members in the first cohort. Typically, both portions will be 50% for offered bets whose outcomes are roughly equally likely, but the portions could be skewed for behavioral, statistical, or other reasons in order to target a balanced book. For example, members who routinely actively reject bets involving the Cleveland Cavaliers underperforming will be more likely to see the overperforming versions of bets on that team, while members who routinely actively accept bets on player overperformance during halftime of football games will see more and more such offerings. The system automatically calculates the volume of bets on either side of the sub-outcome as well as the percentage of members in the first cohort that took the bet. The system then adjusts the percentage of players in the second and succeeding cohorts to ensure a balanced book on the particular sub-outcome bet. As a result of restricting bet offerings to cohorts of registered members, the book cannot be unbalanced by the sudden introduction of a previously unknown player that takes the bet.

Figure 7:
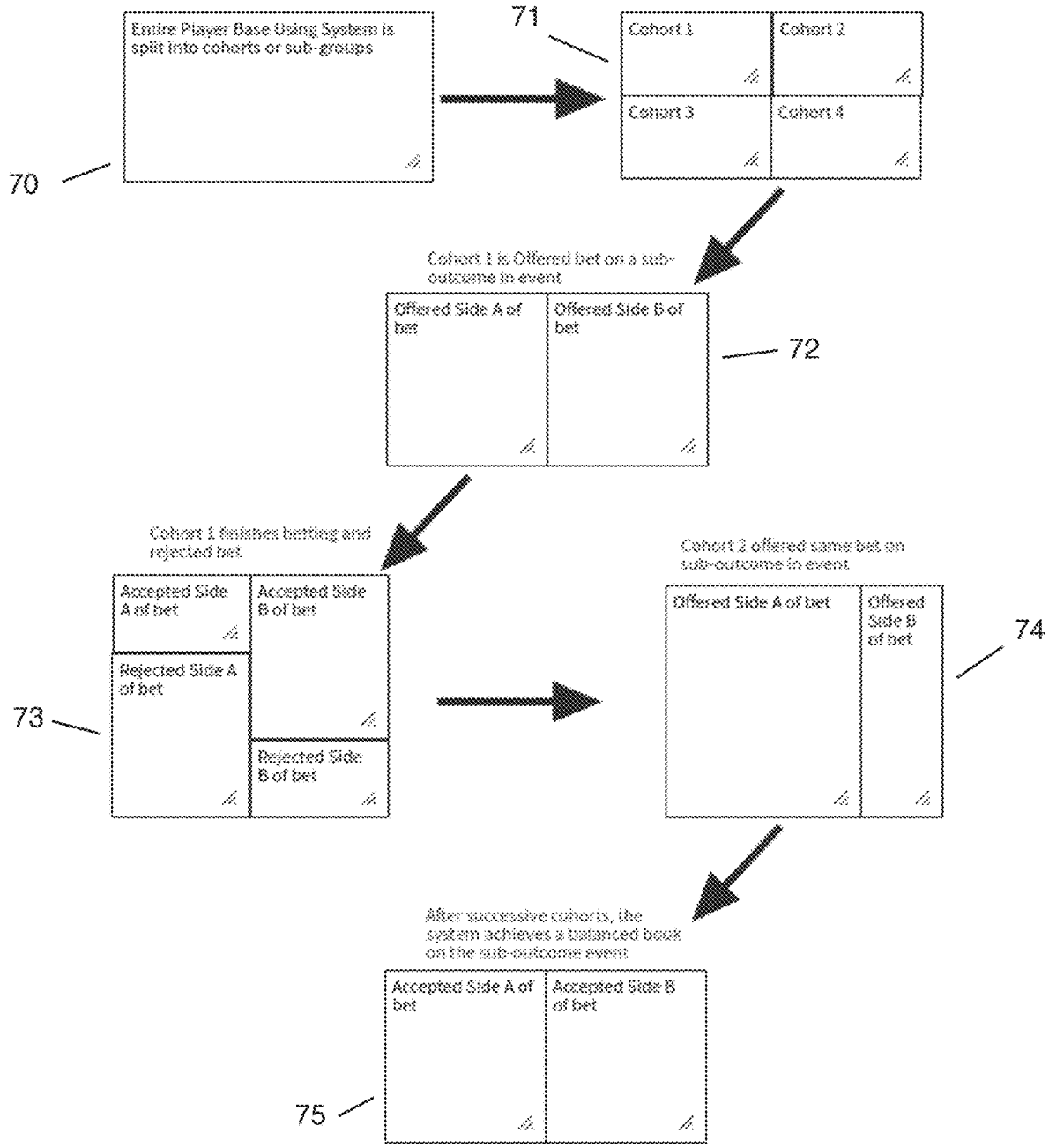
FIG. 7. Illustrates a conceptual diagram of a dynamic offering of bets that automatically balances the risk of a book.

With reference now to FIG. 7. there is illustrated therein one embodiment of a conceptual diagram of a dynamic offering of bets that automatically balances the risk of a book. As shown in the figure, the methodology starts at block 70, where it is shown that the entire player base using the system is split into cohorts or sub-groups. The result of block 70 is shown in block 71 where the player base has beensplit into 4 different cohorts.

In block 72 it is shown how the first cohort may be offered a bet on the suboutcome of the event. For example, certain members of Cohort 1 may be offered Side A of the bet, while the remaining member of Cohort 1 may be offered Side B of the bet.

Block 73 shows the results of the offering from block 72. As shown in the figure, fewer people accepted side A of the bet than rejected side A of the bet. In contrast, block 73 shows that, with respect to Side B of the bet, more people accepted side B of the bet than the number of people who rejected side B of the bet.

In block 74 it is shown how the second cohort may be offered the same bet on the suboutcome of the event. For example, as shown in block 74, a larger number of individuals are may be offered Side A of the bet, while a smaller number of individuals may be offered Side B of the bet. This is done in an effort to balance the book, which is shown in block 75. Block 75 shows that after successive cohorts, the system achieves a balanced book on the sub-outcome event. In the example embodiment provided, approximately the same number of people have accepted both Side a and Side B of the bet.

In accordance with many embodiments of the invention, the operator's system may use the Global Positioning System (GPS) on the device to verify jurisdiction and calculate relevant taxes. Mobile devices run on mobile operating systems that provide an application layer to support applications. One of the available pieces of information that can be requested is the current latitude and longitude of the mobile device. The operator's system requests and requires permission by the user to authorize the system to obtain this GPS information from the device. That information is then uploaded to the operator's system along with the member's identifying information.

Figure 8:
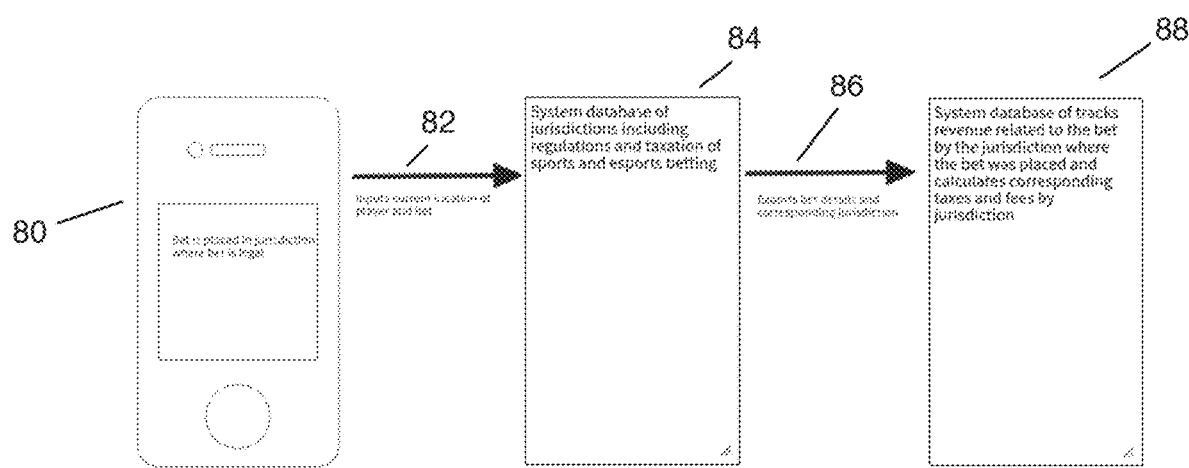
FIG. 8. Illustrates a conceptual diagram of the interaction of the Global Positioning System (GPS) on a player's mobile device with the system's database to automatically calculate taxes and fees for all revenue generated by player's bets.

With reference now to FIG. 8. there is illustrated therein a conceptual diagram of the interaction of the Global Positioning System (GPS) on a player's mobile device with the system's database to automatically calculate taxes and fees for all revenue generated by player's bets. As shown, a player may place a bet in a jurisdiction where the bet is legal 80. The system then inputs the location of the player and the bet 82 into system database 84, which then exports the bet details and corresponding jurisdiction into a database 88. Database 88 is used to track the revenue related to the bet by the jurisdiction where the bet was placed and calculates corresponding taxes and fess by jurisdiction.

In one embodiment, the invention provides for the ability to perform a large number of calculations in an instantaneous fashion that were unable to be performed with the use of prior art systems. For example, no other systems were capable of determining the location of the potential users and calculate the tax consequences of each betting transaction in real time based on the jurisdiction of the user.

As another example, no other system had the capability to curate bets for respective users based on their betting history and/or profile. Prior art systems simply did not have the capability, and the calculations performed by the instant inventions can not be performed by the human mind in real time to provide a interactive wagering environment. Because the inventions disclosed herein provide the capability to offer bets on sub-outcomes of sporting events and esports, the realtime curation, delivery, acceptance, and tax calculation of wagers was not heretofor possible, nor disclosed by any prior art systems known the inventors.

As mentioned above, in some embodiments, the use of artificial intelligence in the determination of what bets are likely to constitute roughly fair propositions applies machine learning techniques such as neural networks or random forests on historical in-game sports data. The data is arranged to indicate the state of the historical game at a particular moment in time, including which athletes are on the field or court, the time remaining, the score so far, and other standard sport-specific state variables. Given a comprehensive high frequency history of games organized in this manner, the artificial intelligence of the machine learned outputs is used to craft new bet offers that, according to the artificial intelligence model, are predicted to have a roughly even chance of success in the intervening time period for the current live game in question with its current live game state parameter values.

The use of artificial intelligence in the decision of which bets to curate to which players involves applications of machine learning on previous decisions, views, and swipes made by the player, as well as previous decisions, views, and swipes made by other, similar players. There are three approaches to using artificial intelligence to solve this problem.

The first is individual deep learning on the actual text of the bet offers. In this approach, a person's own history of bet offers are the input, and the decisions to swipe left, swipe right, never view, or allow to expire are the output, and together they comprise the training set to be learned by a recurrent hierarchical neural network. That recurrent neural network is then applied to new curated bets to calculate the probability that the given individual will accept the proposed offer. The automatic balancing algorithm described elsewhere in this application uses these probabilities as inputs to decide on the basis of that artificial intelligence which bets to offer to which players, and at what time.

The second is individual deep learning on the parameters of the bet offers. As described elsewhere in this application, the list of parameters are the underlying parts of the grammar that are combined to create natural language text. Unlike the first approach, this second approach uses the actual values of the parameters as the inputs, but keeps the same output as before. This second approach provides the artificial intelligence to determine which types of bets, or during what periods, or for what sports, are specifically preferred by the individual, rather than relying on the artificial intelligence automatically learning it from the natural language text.

The third is collaborative filtering or a recommender system that uses artificial intelligence to simultaneously predict the swiping actions of all individuals based on the past history of such decisions for all individuals. This approach too can be further bifurcated into either using the text as the input or the underlying parameters.

Combinations of the above also involve artificial intelligence in the form of ensemble decision trees and ensemble decisions. In addition, through the use of artificial intelligence, the inventions make the computing and curation process more efficient by providing for computing decisions to be made on the intelligence of the system as is learns over time about each of the players. Without the use of AI, the system would not increase its intelligence about the players or events, nor would it be able to provide curated bets that provide the solution for a seamless, real time user experience, and for the ability of the operator to maintain a balanced book with the volume of offerings that are made possible by the inventions.

The curated bets are algorithmically chosen and priced either from current possibilities based on historical performance or from bets available publicly or from a combination thereof. First, salient sub-outcomes are generated given the results of the game so far. For example, if LeBron James has scored 23 points in the first quarter of a basketball game, that result is salient, and sub-outcomes for his future scoring in the next quarter or quarters or next several minutes would be an interesting wager.

Salient outcomes are determined by calculating the proportion of time in the historical sample that a similar outcome had been achieved. For example, a player scoring 20 or more points in one quarter happens very rarely.

Once the salient outcomes are determined, the next relevant time horizons are selected. If the game is nearly at the end of the first quarter, then a natural stoppage in play, and low win probability volatility, would ensue, and offering a wager on LeBron James's second quarter performance would be natural. In sports that do not split into convenient periods, round numbers of minutes such as five or ten would appeal most to the members.

With the salient outcome determined, and the subsequent time horizon selected, a distribution for possible values is calculated from comparison with historical samples. For example, of all second quarter scoring by players who scored above average in the first quarter, what is the average and standard deviation? Using those two numbers as the parameters for a normal distribution, also known as a bell curve, the system computes roughly breakeven targets for the subsequent performance. This then becomes the curated bet that is immediately offered to the first cohort, and adjusted dynamically afterwards.

Because systems in accordance with embodiments of the invention provide a short time frame to place bets, and a simple swipe or press to place bets, and because bets are resolved in a short time frame based on sub-outcomes of the sport or esport, these systems are more fun, simple and fast-paced than traditional wagering games.

Traditional wagers are typically made available in one of two ways: either they are relatively rich and deep markets but limited to only during substantial and pre-scheduled stoppages in play, such as halftimes, or they are relatively poor and shallow markets available at any time but only for wagers starting after the next stoppage in play, such as wagers on the score after halftime. In both cases, wagers are a "pull" mechanism where it is up to the individual player to find and execute the appropriate wager.

In the system described here, wagers are made available on a "push" mechanism where players are given a single time-constrained choice rather than a menu of relatively time-unconstrained choices. As a further difference, the curated bets offered only allow the acceptance of the side presented, not the opposite side. Additionally, the curated bets can pop up during non-prescheduled stoppages in play, for example, during an unexpected timeout, or a temporary transition situation, or other situations where the volatility of the win probability is near zero. This increases the fun, simplicity, and pace of wagering compared to the traditional approach. Furthermore, these systems allow players to enjoy meaningful game time and provide fun interaction during less-meaningful game time.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. Although certain specific features and aspects of a gaming system have been described herein, many additional modifications and variations would be apparent to those skilled in the art. For example, the features and aspects described herein may be implemented independently, cooperatively or alternatively without deviating from the spirit of the disclosure. It is therefore to be understood that a gaming system may be practiced otherwise than as specifically described. Thus, the foregoing description of the gaming system should be considered in all respects as illustrative and not restrictive, the scope of the claims to be determined as supported by this disclosure and the claims' equivalents, rather than the foregoing description. While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

The invention claimed is:

1. A computer system configured to solve a problem of offering a community of players a series of progressive and specifically curated bets on an imminent sub-outcome of a sport or e-sport event in real-time through the use of artificial intelligence to reduce the amount of computer resources that the computer system would otherwise need to perform the scale of the offerings of the progressive and specifically curated bets, comprising:
at least one specialized computer machine, comprising:
a non-transient memory having at least one region for storing particular computer executable program code;
a database containing applicable gambling laws, regulations and taxation of worldwide jurisdictions; and
at least one processor for executing the particular program code stored in the memory, wherein the particular program code is configured to at least perform the following operations:
electronically and in real-time receiving from at least more than one group of electronic devices, information regarding the location of each electronic device in said at least more than one group of electronic devices;
wherein said at least more than one group of electronic devices comprises multiple cohorts of electronic devices; and
wherein each electronic device in said at least more than one group of electronic devices is associated with a player; and
electronically and in real-time integrating the information regarding the location of each electronic device in said at least more than group of electronic devices with said database containing applicable laws, regulations and taxation of worldwide jurisdictions wherein the integration of the transmission of each of the electronic devices location with the database containing applicable laws, regulations and taxation of worldwide jurisdictions comprises a determination of the current jurisdiction of each of the electronic devices;
electronically and in real-time causing to display on a first subset of screens of a first cohort of electronic devices a first offer to bet on an imminent sub-outcome of a sport or e-sport event;
wherein said first cohort of electronic devices is a subset of electronic device from said at least more than one group of electronic devices;
electronically and in real-time causing to display on a second subset of screens of the first cohort of electronic devices a second offer to bet on the other side of the first offer to bet the imminent sub-outcome of a sport or e-sport event;
electronically and in real-time receiving from individual electronic devices in said first cohort of electronic devices, bets in response to said first offer to bet on an imminent sub-outcome of a sport or e-sport event, and said second offer to bet on an imminent sub-outcome of a sport or e-sport event;
electronically and in real-time causing to display on a first subset of screens of a second cohort of electronic devices the first offer to bet on an imminent sub-outcome of a sport or e-sport event;
wherein said second cohort of electronic devices is a subset of electronic device from said at least more than group of electronic devices;
electronically and in real-time causing to display on a second subset of screens of the second cohort of electronic devices a second offer to bet on the other side of the first offer to bet the imminent sub-outcome of a sport or e-sport event;
electronically and in real-time receiving from individual electronic devices in said second cohort of electronic devices, bets in response to said first offer to bet on an imminent sub-outcome of a sport or e-sport event, and said second offer to bet on an imminent sub-outcome of a sport or e-sport event;
wherein the first offer to bet on an imminent sub-outcome of a sport or e-sport event and the second offer to bet on an imminent sub-outcome of a sport or e-sport event that are offered to the second cohort is a progressive offering with percentages determined based on said first cohort's betting activity;
electronically and in real-time recording a time and location record for each bet received;
electronically and in real-time calculating of all federal, state and local taxes for each bet received;
wherein said progressive offering is further calculated based on the use of artificial intelligence and machine learning.

2. The computer system according to claim 1, wherein the use of artificial intelligence in the decision of which offers of bets to curate to which players involves applications of machine learning on previous betting decisions made by the players, as well as previous betting decisions, made by other, similar players.

3. The computer system according to claim 2, wherein the use of artificial intelligence in the decision of which offers of bets to curate to which players is based upon individual deep learning on the text of previous bet offers.

4. The computer system according to claim 2, wherein the use of artificial intelligence in the decision of which bets to curate to which players is based upon individual deep learning on the parameters of the previous bet offers.

5. The computer system according to claim 2, wherein the use of artificial intelligence in the decision of which bets to curate to which players is based upon a recommender system that uses artificial intelligence to simultaneously predict the betting decisions of all individual players based on the past history of such decisions for all individual players.

6. The computer system according to claim 1, wherein the composition of said first cohort and second cohort is determined by the location of electronic devices, and the betting history of each of said electronic devices.

7. The computer system according to claim 6, wherein the composition of said first subset of screens of a first cohort, second subset of screens of a first cohort, first subset of screens of a second cohort, and second subset of screens of a second cohort is determined by the location of electronic devices, and the betting history of each of the electronic devices.

8. The computer system according to claim 1, wherein said first offer to bet on an imminent sub-outcome of a sport or esport event, and said second offer to bet on an imminent sub-outcome of a sport or esport event are made available for an amount of time between 3 seconds and 90 minutes.

9. The computer system according to claim 1, wherein said location information is global positioning system information.

10. The computer system according to claim 1, wherein the composition of said first cohort and second cohort is determined by whether the jurisdiction of the location of electronic devices allows for real money bets to be offered on said sport or e-sport event.

11. The computer system according to claim 10, wherein the calculation of all federal, state and local taxes for each bet received comprises a programmatic calculation of all withholding taxes for the player, and a programmatic calculation of all income taxes for the operator.

12. The computer system according to claim 1, wherein the progressive offering to subsequent cohorts is based on the prior cohorts' betting activity to reduce the operator's net exposure to the bet is made programmatically.

13. A computer-implemented method for offering a community of players a series of progressive and specifically curated bets on an imminent sub-outcome of a sport or e-sport event in real-time through the use of artificial intelligence to reduce the amount of computer resources that the computer system would otherwise need to perform the scale of the offerings of the progressive and specifically curated bets, comprising:

electronically and in real-time receiving from at least more than one group of electronic devices, information regarding the location of each electronic device in said at least more than one group of electronic devices;

wherein said at least more than one group of electronic devices comprises multiple cohorts of electronic devices; and wherein each electronic device in said at least more than one group of electronic devices is associated with a player; and electronically and in real-time integrating the information regarding the location of each electronic device in said at least more than group of electronic devices with a database containing applicable laws, regulations and taxation of worldwide jurisdictions wherein the integration of the transmission of each of the electronic devices location with the database containing applicable laws, regulations and taxation of worldwide jurisdictions comprises a determination of the current jurisdiction of each of the electronic devices;

electronically and in real-time causing to display on a first subset of screens of a first cohort of electronic devices a first offer to bet on an imminent sub-outcome of a sport or e-sport event;

wherein said first cohort of electronic devices is a subset of electronic device from said at least more than one group of electronic devices;

electronically and in real-time causing to display on a second subset of screens of the first cohort of electronic devices a second offer to bet on the other side of the first offer to bet the imminent sub-outcome of a sport or e-sport event;

electronically and in real-time receiving from individual electronic devices in said first cohort of electronic devices, bets in response to said first offer to bet on an imminent sub-outcome of a sport or e-sport event, and said second offer to bet on an imminent sub-outcome of a sport or e-sport event;

electronically and in real-time causing to display on a first subset of screens of a second cohort of electronic devices the first offer to bet on an imminent sub-outcome of a sport or e-sport event;

wherein said second cohort of electronic devices is a subset of electronic device from said at least more than group of electronic devices;

electronically and in real-time causing to display on a second subset of screens of the second cohort of electronic devices a second offer to bet on the other side of the first offer to bet the imminent sub-outcome of a sport or e-sport event;

electronically and in real-time receiving from individual electronic devices in said second cohort of electronic devices, bets in response to said first offer to bet on an imminent sub-outcome of a sport or e-sport event, and said second offer to bet on an imminent sub-outcome of a sport or e-sport event;

wherein the first offer to bet on an imminent sub-outcome of a sport or e-sport event and the second offer to bet on an imminent sub-outcome of a sport or e-sport event that are offered to the second cohort is a progressive offering with percentages determined based on said first cohort's betting activity;

electronically and in real-time recording a time and location record for each bet received;

electronically and in real-time calculating of all federal, state and local taxes for each bet received; wherein said progressive offering is further calculated based on the use of artificial intelligence and machine learning.

14. The method according to claim 13, wherein the use of artificial intelligence in the decision of which offers of bets to curate to which players involves applications of machine learning on previous betting decisions made by the players, as well as previous betting decisions, made by other, similar players.

15. The method according to claim 14, wherein the use of artificial intelligence in the decision of which offers of bets to curate to which players is based upon individual deep learning on the text of previous bet offers.

16. The method according to claim 14, wherein the use of artificial intelligence in the decision of which bets to curate to which players is based upon individual deep learning on the parameters of the previous bet offers.

17. The method according to claim 14, wherein the use of artificial intelligence in the decision of which bets to curate to which players is based upon a recommender system that uses artificial intelligence to simultaneously predict the betting decisions of all individual players based on the past history of such decisions for all individual players.

18. The method according to claim 15, wherein the composition of said first cohort and second cohort is determined by the location of electronic devices, and the betting history of each of said electronic devices.

19. The method according to claim 18, wherein the composition of said first subset of screens of a first cohort, second subset of screens of a first cohort, first subset of screens of a second cohort, and second subset of screens of a second cohort is determined by the location of electronic devices, and the betting history of each of the electronic devices.

20. The method according to claim 15, wherein said first offer to bet on an imminent sub-outcome of a sport or esport event, and said second offer to bet on an imminent sub-outcome of a sport or esport event are made available for an amount of time between 3 seconds and 90 minutes.

* * * * *